(12) United States Patent
Unger et al.

(10) Patent No.: US 12,305,781 B2
(45) Date of Patent: May 20, 2025

(54) CONNECTOR AND CONNECTOR ASSEMBLY FOR MULTI-CHAMBER PROFILES AND/OR CONDUITS

(71) Applicant: NORMA Germany GmbH, Maintal (DE)

(72) Inventors: Dennis Unger, Maintal (DE); Detlef Henrich, Maintal (DE); Nina Harm, Maintal (DE)

(73) Assignee: Norma Germany GmbH, Maintal (DE)

( * ) Notice: Subject to any disclaimer, the term of this patent is extended or adjusted under 35 U.S.C. 154(b) by 477 days.

(21) Appl. No.: 17/774,580

(22) PCT Filed: Nov. 2, 2020

(86) PCT No.: PCT/EP2020/080639
§ 371 (c)(1),
(2) Date: May 5, 2022

(87) PCT Pub. No.: WO2021/089459
PCT Pub. Date: May 14, 2021

(65) Prior Publication Data
US 2022/0399594 A1 Dec. 15, 2022

(30) Foreign Application Priority Data
Nov. 5, 2019 (DE) .................... 10 2019 129 828.8

(51) Int. Cl.
*F16L 25/14* (2006.01)
*F16L 21/02* (2006.01)
*H01M 10/6556* (2014.01)

(52) U.S. Cl.
CPC ............. *F16L 25/14* (2013.01); *F16L 21/022* (2013.01); *H01M 10/6556* (2015.04); *H01M 2220/20* (2013.01)

(58) Field of Classification Search
CPC ....... F16L 25/14; F16L 41/001; F16L 41/021; F16L 21/08; F28F 1/022; F28F 9/0221; H05K 7/20927
(Continued)

(56) References Cited

U.S. PATENT DOCUMENTS 5,219,461 A 6/1993 Hyll et al.
5,257,904 A 11/1993 Sullivan
(Continued)

FOREIGN PATENT DOCUMENTS

CA 2844977 A1 9/2014
CN 108539319 A 9/2018
(Continued)

OTHER PUBLICATIONS

Japanese Office Action for Japanese Application No. 2022-526245 dated Jun. 20, 2023 (7 pages).
(Continued)

*Primary Examiner* — David Bochna
(74) *Attorney, Agent, or Firm* — REISING ETHINGTON, P.C.

(57) ABSTRACT

A connector for two fluid conduits of different geometries includes a housing having a first and a second connection portion and a fluid channel fluidically connecting both connection portions; a locking element which can be coupled to the housing; and a seal which can be positioned between the housing and the locking element. The locking element and the housing can be positioned relative to one another with respect to the fluid channel such that a receiving portion for receiving the seal is formed between the housing and the locking housing. The first connection portion is designed to connect a first fluid conduit with an
(Continued)

elongated cross-section and the second connection portion is designed to connect a second fluid conduit with a round cross-section.

14 Claims, 6 Drawing Sheets

(58) Field of Classification Search
USPC .......................................................... 285/404
See application file for complete search history.

(56) References Cited

U.S. PATENT DOCUMENTS

| | | | |
|---|---|---|---|
| 8,689,837 B1 * | 4/2014 | Smith .................. | F16L 11/121 285/179 |
| 9,939,096 B2 | 4/2018 | Tiberghien et al. | |
| 10,208,879 B2 * | 2/2019 | Hunt ....................... | F28F 1/022 |
| 10,765,043 B2 | 9/2020 | Siedl et al. | |
| 2003/0131981 A1 * | 7/2003 | Kohler .................... | F28F 1/022 165/178 |
| 2017/0343144 A1 | 11/2017 | Hunt et al. | |
| 2021/0249711 A1 * | 8/2021 | Kollar .................... | F28F 1/022 |

FOREIGN PATENT DOCUMENTS

| | | | |
|---|---|---|---|
| DE | 3615476 | A1 | 11/1986 |
| DE | 9204442 | U1 | 7/1992 |
| DE | 202006006756 | U1 | 7/2006 |
| DE | 202010014349 | U1 | 1/2012 |
| DE | 102016125859 | A1 | 7/2017 |
| FR | 3080166 | A1 | 10/2019 |
| JP | 2001178666 | A | 7/2001 |

OTHER PUBLICATIONS

English Translation of Japanese Office Action for Japanese Application No. 2022-526245 dated Jun. 20, 2023 (9 pages).
Japanese Office Action for Japanese Application No. 2022-526245 dated Dec. 5, 2023 (3 pages).
English Translation of Japanese Office Action for Japanese Application No. 2022-526245 dated Dec. 5, 2023 (5 pages).
European Office Action for European Application No. 20808304.8 dated Dec. 8, 2023 (5 pages).
Chinese Office Action for Chinese Application No. 202080065619.4 dated Mar. 18, 2024 (7 pages).
Second Chinese Office Action for Chinese Application No. 202080065619.4 dated Jul. 26, 2024 (3 pages).
Summary of Second Chinese Office Action for Chinese Application No. 202080065619.4 dated Jul. 26, 2024 (1 page).
German Office Action for German Application No. 10 2019 129 828.8 dated Jul. 27, 2020 (5 pages).
International Search Report for International Application No. PCT/EP2020/080639 dated Jan. 21, 2021 (3 pages).
English Translation of International Search Report for International Application No. PCT/EP2020/080639 dated Jan. 21, 2021 (2 pages).
Korean Office Action for Korean Application No. 10-2022-7012758 dated Dec. 20, 2023 (7 pages).
English Translation of Korean Office Action for Korean Application No. 10-2022-7012758 dated Dec. 20, 2023 (7 pages).

* cited by examiner

CONNECTOR AND CONNECTOR ASSEMBLY FOR MULTI-CHAMBER PROFILES AND/OR CONDUITS

INTRODUCTION

The disclosure relates to a connector, and to a connector arrangement.

The prior art has disclosed different connectors for connecting differently dimensioned fluid lines. In the area of electric vehicles, connectors by means of which different fluid lines of a temperature-regulating device of energy stores can be coupled to one another are for example required. The energy stores may for example be accumulators or batteries. The present disclosure relates to a connector which can be used in the region of a temperature-regulating device. Connectors and connector arrangements may of course also be used in areas other than vehicle construction and electric vehicle construction. Use is in principle possible in all areas or applications in which differently dimensioned fluid lines are connected to one another and there is an increased cooling requirement with limited structural space. Use in plant construction, in particular in the chemical industry, and in the area of the food industry or the pharmaceutical industry is conceivable. It is particularly conceivable to be used where production installations have to be cooled and where limited spatial conditions prevail or where the available structural space is limited. Use in utility vehicles with conventional drives, for example in excavators, forestry machinery and rail vehicles, is furthermore conceivable.

Generic connectors are used to connect conventional pipelines of circular cross section to flat profiles or to lines which have a flat, elongate cross section and in which a plurality of mutually separate, generally parallel line channels form a corresponding flat profile.

Here, there are high requirements for the operational reliability of the energy store, of the corresponding temperature-regulating device and thus also of the connectors installed therein. The normal safety standards in the automotive sector in particular have to be adhered to. It is to be ensured for example that any leakage within the energy store is prevented. Furthermore, the connectors must be designed to withstand the pressure conditions in conventionally used fluids, such as water/glycol mixtures.

A fundamental problem in the case of connectors of said type results from the fact that said connectors have to reliably couple to one another lines of two completely different geometries, of which one is a completely unconventional geometry with a narrow, almost line-shaped cross section. This narrow cross section complicates the required sealing of the connection. Moreover, the narrow cross section, with its corresponding straight planes, makes it more difficult for the flat-tube-shaped line to be fixed to the connector in an axial direction. This is because for example a thread cannot be used for securing the flat profile.

Owing to the rapidly progressive development in the area of charging speed of energy stores and of power requirements of corresponding electric vehicles, the requirements for the temperature-regulating device of the energy stores are also increased. This in turns makes it necessary to realize corresponding improvement also in the area of the fluid lines and the connectors thereof.

SUMMARY

Against this background, it is an object per an embodiment to provide an improved connector, by means of which fluid lines of significantly different geometries can be coupled to one another in a sealed and fixed manner. Moreover, the intention is for the connector to be as easy to produce as possible and to make it possible for a corresponding connection to be established easily and as far as possible without tools and/or automatically, per various embodiments. The connector may be used in the area of automobile energy stores and generally in any areas in which different fluid lines have to be coupled to one another. The connector, per an embodiment, offers particular advantages in regions with limited structural space and in applications with an increased cooling requirement.

The disclosure relates to a connector for two fluid lines, or for multi-chamber profiles and/or lines, of different geometries. The connector is configured to connect these two fluid lines to one another. The connector comprises a housing, which has a first and a second connection section and has a fluidically connecting fluid channel. The connection sections are configured for being coupled to the fluid lines. The connector furthermore comprises a locking element, which can be coupled to the housing, and a seal, which can be arranged between the housing and the locking element.

The locking element and the housing can be arranged with respect to one another in such a way that a receiving section for receiving the seal is formed between the housing and the locking element.

The coupling of the housing to the locking element allows the seal and/or one of the two fluid lines to be fixed to the connector, in particular clamped firmly thereto. The housing and the locking element may, for example, in a form-fitting manner, be brought into engagement with one another in such a way that the seal is enclosed, fixed, and/or, for the purpose of sealing, subjected to stress and in the process deformed, between the two housing parts, that is to say between housing and locking element. In the coupled state of the two housing parts, one fluid line may be fixed at least in a radial direction. In the present case, radial direction is to be understood as meaning a direction which is perpendicular to the longitudinal direction or to the main flow direction of the fluid line.

It is furthermore provided that the first connection section is configured for connection of a first fluid line with an elongate cross section, and the second connection section is configured for connection of a second fluid line with another, in particular circular, cross section.

It is possible in this way for two fluid lines of different geometries to be easily and inexpensively connected to one another in a leakage-free manner.

In an embodiment, the housing and/or the locking element are/is manufactured as a single piece, in particular by injection molding or die casting or additive production. Here, the housing parts may correspondingly be manufactured from metal and/or plastic. The use of casting processes for production of housing parts allows said production to be realized particularly inexpensively and in a manner particularly suitable for mass production. Additive production processes are to be understood as being in particular all commonly used 3D printing processes.

In a further embodiment, it is conceivable that the housing and the locking element can be latched (i.e., latch-able) to one another. Such latching constitutes a particularly favorable and simple form of the connection of the two components. For this purpose, provision may be made at the housing part and the locking element of snap-fit connections and corresponding cutouts that engage with one another when the two parts are positioned one inside the other or one against the other.

In a further embodiment, it is conceivable that a fixing section is provided at the housing and/or at the locking element and is configured for fixing of the first fluid line. The fixing section may be configured for fixing of the first fluid line in an axial direction. In this way, it can be ensured that the fluid line does not undesirably switch from a state in which it is coupled to the connector to a state in which it is decoupled from the connector and, as a consequence, a fluid flowing through the connector undesirably flows out of the latter.

In an embodiment, it may be provided here that the fixing section comprises at least one cutout for introduction of a fixing element, and/or at least one snap-fit connection, wherein the fixing element and the snap-fit connection are configured for form-fitting fixing of the first fluid line to the connector. The fluid line may for this purpose comprise a cutout, or leadthrough, into which the fixing element or the snap-fit connection can at least partially be introduced. In an embodiment, the snap-fit connection may be formed in one piece with the corresponding housing part. The snap-fit connection may be formed such that, when the first fluid line is introduced into the connector, the snap-fit connection latches into the cutout or leadthrough of the fluid line. The fluid line is consequently fixed in an axial direction.

In a further embodiment, it is conceivable that the connector consists of exactly and solely the three components housing, locking element and seal, or in that the connector consists of the three components housing, locking element and seal and of at least one fixing element. The two fluid lines, in a state in which they are connected to one another, may be in direct contact with all the stated components. The fixing element may be a component which is separated from the other three components, such as a securing pin, a sheet-metal insert, which may be manufactured from spring steel, or some other arresting device.

In a further embodiment, it is conceivable that the outer dimensions of the housing and the locking element, in terms of their cross sections, are very similar to one another and complementary to each other. In this way, a uniform exterior of the connector can be ensured in a state in which the housing and the locking element are coupled to one another. The two housing parts may thus have different longitudinal extents, but, in a radial direction, neither of the two housing parts extends significantly further than the in each case other housing part.

In a further embodiment, it is conceivable that the fluid channel is at least sectionally in the form of a flat and planar cutout within the housing. A flat cutout is to be understood as meaning one which extends significantly further in two mutually perpendicular spatial directions than in the third spatial direction. Such a flat fluid channel acting as a connection channel between the two significantly different fluid lines makes possible an unhindered fluid flow between the two fluid lines that is as steady as possible, and that can be maintained with correspondingly low throughflow resistance or low pressure loss.

In a further embodiment, it is conceivable that the first fluid line can be introduced (i.e., introduce-able) at least partially into the fluid channel, and/or that the housing comprises stiffening ribs at the outside. By virtue of the planar or areal design of the fluid channel, it is possible for the likewise areal or flat-tube-shaped first fluid line to be introduced at least partially into the fluid channel and, in this way, for the best possible attachment of the first fluid line to the connector to be ensured.

The disclosure furthermore concerns a connector arrangement having a connector, wherein the connector is coupled to a fluid line which is in the form of a flat channel. In an embodiment, the connector arrangement may possibly be preassembled and, in this way, used more easily in further fitting steps during the fitting of an energy store.

BRIEF DESCRIPTION OF THE FIGURES

Further features, details and advantages of the invention emerge from the wording of the claims and from the following description of exemplary embodiments on the basis of the drawings. In the drawings:

DETAILED DESCRIPTION

Figure 1A:
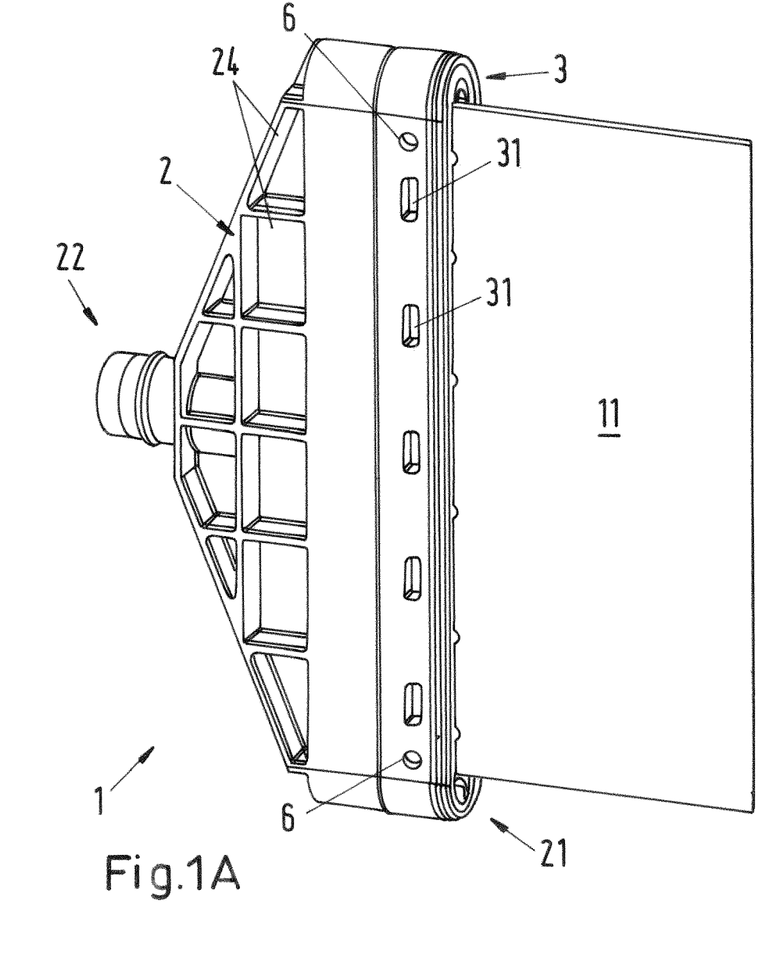
FIG. 1A shows a perspective view of a connector arrangement.

FIG. 1A shows a connector arrangement having a connector 1 for two fluid lines, wherein a first fluid line 11 is shown on the right at the first connection section 21, and a second fluid line is not shown but can be coupled to the connector 1 on the left at the connection section 22. The connection of the second fluid line may be realized via any standard connections, such as for example via an SAE connection. The first connection section 21 may be a region in the interior of a housing 2 of the connector 1.

The first fluid line 11 may be in the form of a very flat tube or flat profile, while the second fluid line may be a fluid line with a conventional circular cross section. The two fluid lines 11 can consequently have significantly different geometries.

The first fluid line 11 may have a width of up to 120 mm with a height of for example merely 3 mm. Said first fluid line may be manufactured for example from aluminum or an aluminum alloy, some other metal alloy or a suitable plastic.

Provided in the housing 2 with the first and second connection sections 21, 22 and fluidically connecting both connection sections 21, 22 is a fluid channel 23, which is shown in the following FIG. 1B. A locking element 3 is coupled to the housing 2. The locking element 3 may also be referred to as clamping piece. The housing 2 has stiffening ribs 24, which may be arranged in particular in a region which is adjacent to the second connection section 22 and is further away from the first connection section 21.

Both the housing 2 and the locking element 3 may be manufactured as a single piece, in particular by injection molding or die casting. As is indicated in FIG. 1A, the housing 2 and the locking element 3 may be latched to one another. Shown for this purpose are five elongate cutouts 31 arranged one above the other, into which the snap-fit connections 32 (shown in the following figures) latch.

Two bores serving as fixing section 6 can be seen at the locking element 3. A fixing element (not shown in any more detail) can be introduced into these bores or else cutouts, which fixing element also extends through a corresponding cutout or bore in the first fluid line 11. In this way, the fluid line 11 can be fixed in relation to the connector 1.

Alternatively or additionally, it is also possible to provide as fixing section 6 at least one snap-fit connection 32, which is likewise configured for form-fitting fixing of the first fluid line 11 to the connector 1. Said snap-fit connection 32 may be arranged on an inner side of the housing 2 and/or of the locking element 3 and be oriented in the direction of the first fluid line 11, which can be arranged therein. When the first fluid line 11 is introduced into the housing 2 or into the locking element 3, said snap-fit connection 32 may latch into a corresponding cutout or bore in the first fluid line 11 and, in this way, fix said fluid line 11 to the connector 2.

FIG. 1A furthermore shows that the outer dimensions of the housing 2 and the locking element 3, in terms of their cross sections, are very similar to one another and complementary to each other. Thus, both housing parts 2, 3 in FIG. 1A extend substantially equally far in a vertical direction and in the direction of the plane of the drawing. By contrast, in an axial direction or approximately in the horizontal direction in FIG. 1A, the housing 2 extends significantly further than, specifically more than 2 times or more than 3 times as far as, the locking element 3.

Figure 1B:
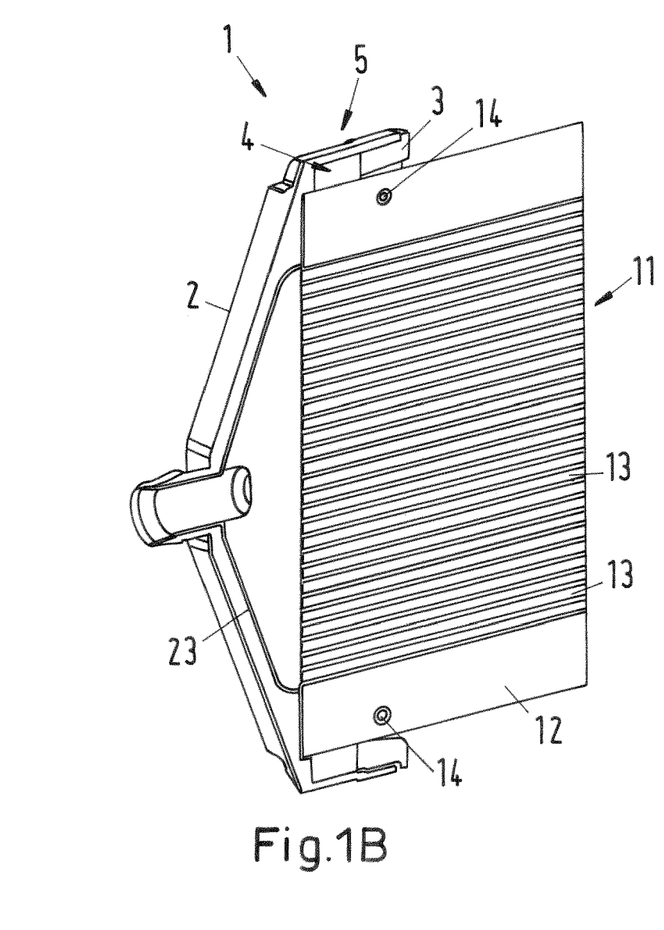
FIG. 1B shows a perspective longitudinal sectional view of a connector arrangement.

FIG. 1B is a longitudinal sectional view of the connector arrangement shown in FIG. 1A. Shown here in addition to the components that can be seen in FIG. 1A is a seal 4 which is arranged between the housing 2 and the locking element 3. The seal 4 may be in the form of an O-ring which engages fully around the first fluid line 11 so that no fluid can flow to the outside of the connector 1 from the fluid lines.

The housing 2 and the locking element 3 are formed, and are arranged with respect to one another, in such a way that a receiving section 5 for receiving the seal 4 is formed. Here, the seal 4 is held in a chamber which forms the receiving section 5, and which is delimited radially to the outside by the housing 2 and/or the locking element 3, radially to the inside by the first fluid line 11, and in the two axial directions by the housing 2, on the one hand, and by the locking element 3, on the other hand.

A fluid channel 23 which fluidically connects the two fluid lines to one another is shown within the connector 1. The fluid channel 23 is of areal form. It may substantially have a triangular basic shape. The fluid channel 23 widens from the first connection section 21 to the second connection section 22 such that, in the regions in which it communicates with the fluid lines, it has substantially their width extent. This makes possible a throughflow of the fluid channel 23, and thus of the connector 1, with the lowest possible losses.

It can furthermore be seen that the first fluid line 11 comprises a plurality of for example parallel line channels 13 and, between the line channels 13 and the upper and lower edge of the fluid line 11, in each case one edge region 12 without such line channels 13 is provided. Shown in said edge region 12 at the bottom and at the top are in each case one leadthrough 14, into which fixing elements or snap-fit connections 32 for fixing the fluid line 11 to the connector 1 may be introduced.

FIG. 1B shows that the connector 1 may consist of the exactly three components housing 2, locking element 3 and seal 4. If, as fixing element, use is made not of a snap-fit connection 32, but rather for example a securing pin, then the connector 1 may consist of exactly four different components, wherein it is of course also possible for more than a single securing pin to be used.

Figure 2A:
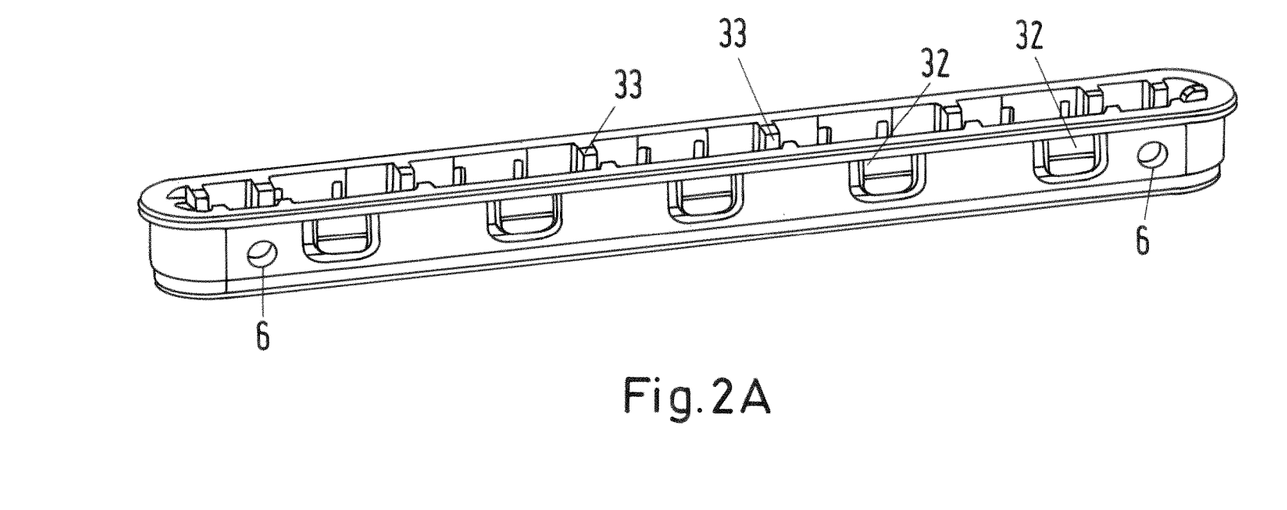
FIG. 2A shows a perspective view of a locking element.
Figure 2B:
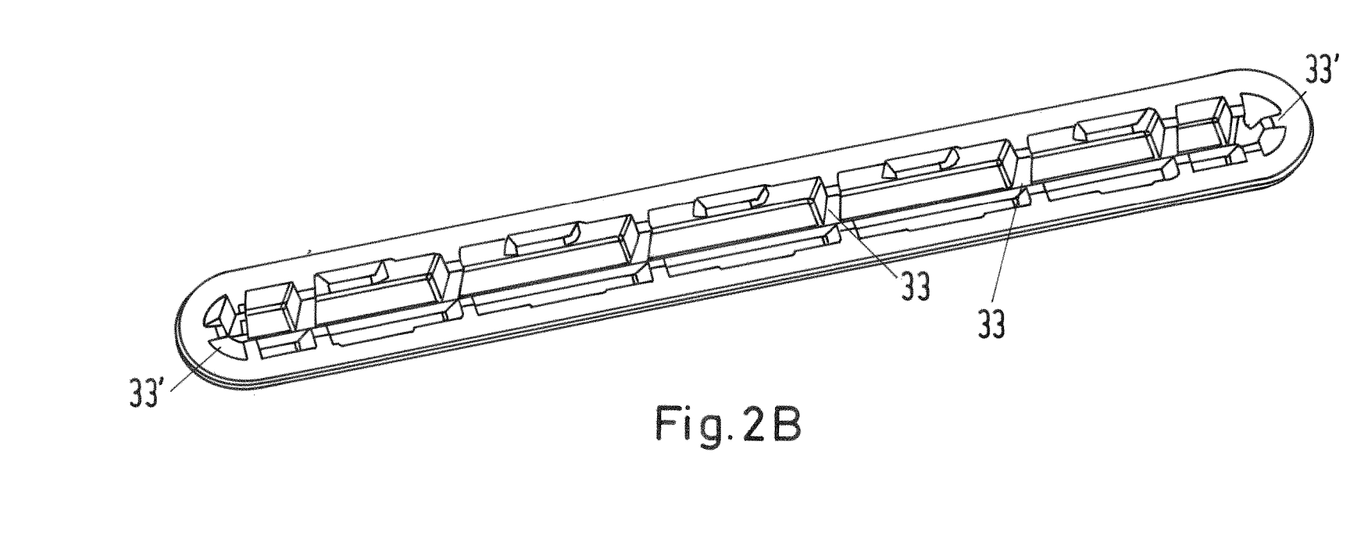
FIG. 2B shows a further perspective view of the locking element.

FIGS. 2A and 2B show different views of the locking element 3. In this embodiment, the locking element 3 has snap-fit connections 32, while the housing 2 must have corresponding cutouts 31, or leadthroughs, into which the snap-in connections 32 can latch. The exemplary embodiment shows a total of ten snap-fit connections 32, wherein in each case five snap-fit connections 32 are arranged opposite one another. It can furthermore be seen that the locking element 3 comprises leadthroughs or bores as fixing sections 6. However, an embodiment in which, alternatively or additionally, provision is made of corresponding snap-fit connections 32 and/or fixing sections 6 at the housing 2 is also conceivable. If the snap-fit connections are additionally or alternatively provided on the housing 2, then corresponding cutouts 31 must of course be present at the locking element 3 to make latching possible.

FIG. 2B shows ribs 33 which are arranged in the interior of the locking element 3 and which are configured to make contact with the first fluid line 11 and to fix the latter within the locking housing 3. Here, in each case one rib 33 and one snap-fit connection 32 may be arranged in an alternating manner. The ribs 33 may be arranged along a longitudinal side and a width side of the locking element 3. In particular, two ribs 33' may be arranged in a plane of symmetry of the locking element 3. Said two ribs 33' may make contact with, or fix, the fluid line 11 laterally.

Figure 3A:
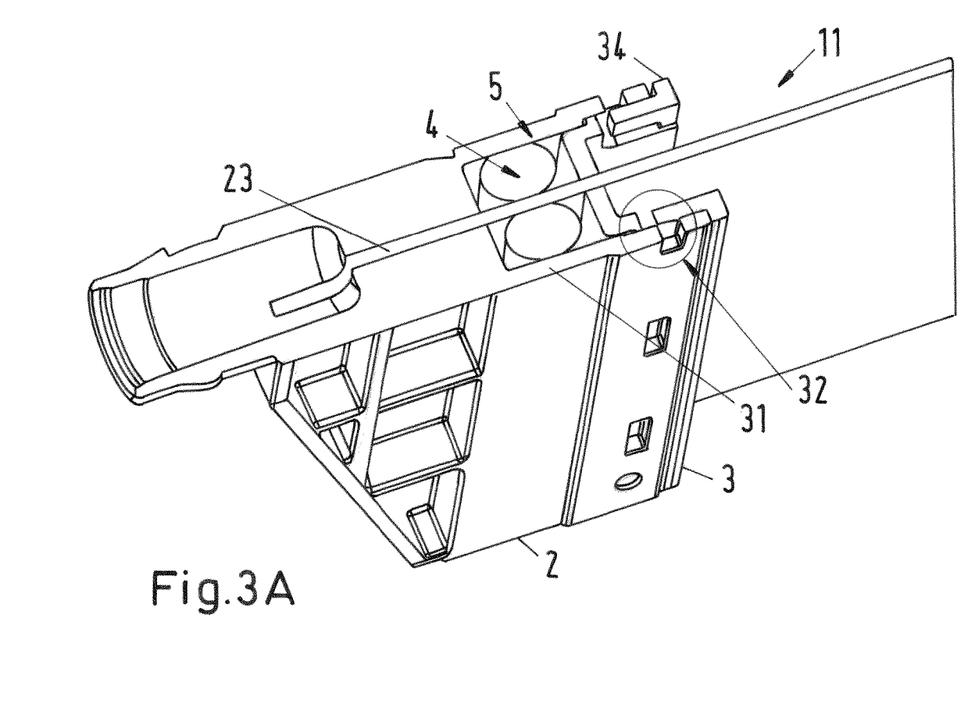
FIG. 3A shows a further perspective longitudinal sectional view of the connector arrangement.
Figure 3B:
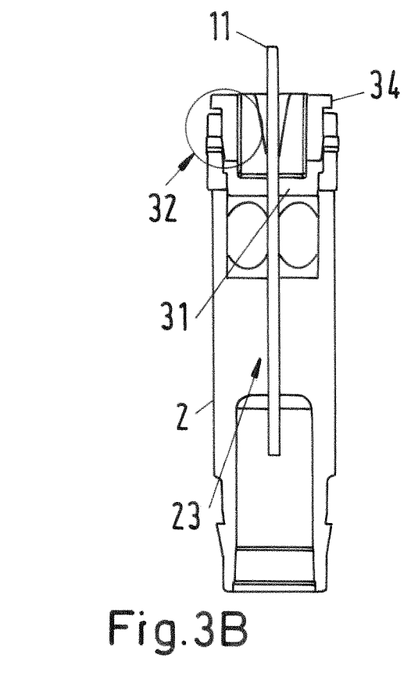
FIG. 3B shows a lateral longitudinal sectional view of the connector arrangement.

FIGS. 3A and 3B show two sectional views of the connector arrangement in which details concerning the position of the first fluid line 11 and concerning the coupling of the housing 2 to the locking element 3 can be seen. In this regard, the first fluid line 11 has been introduced partially into the fluid channel 23 and in this way a better coupling of the fluid line 11 to the connector 1 has been achieved.

Furthermore, two snap-fit connections 32 of the locking element 3 are shown in a latched-in state. Here, the snap-fit connections 32 extend into corresponding cutouts 31 of the housing 2 and thereby fix the locking element 3 to the housing 2. Further fixing of the locking element 3 to the housing 2 is realized by an edge section 34 of the locking element 3, which edge section bears on a peripheral edge region of the housing 2 and forms a stop. The edge section 34 and the snap-fit connections 32 together fix the locking element 3 to the housing 2 in both axial directions.

As emerges further from FIGS. 3A and 3B, both the housing 2 and the locking element 3 may be of symmetrical form in relation to the plane in which the first fluid line 11 extends. It can furthermore be seen that the receiving section 5 extends approximately equally as far as the locking element 3 in the axial direction. In particular, it is conceivable that the axial extent of the receiving section 5 corresponds to at least 50% of the axial extent of the locking section 3.

Figure 4:
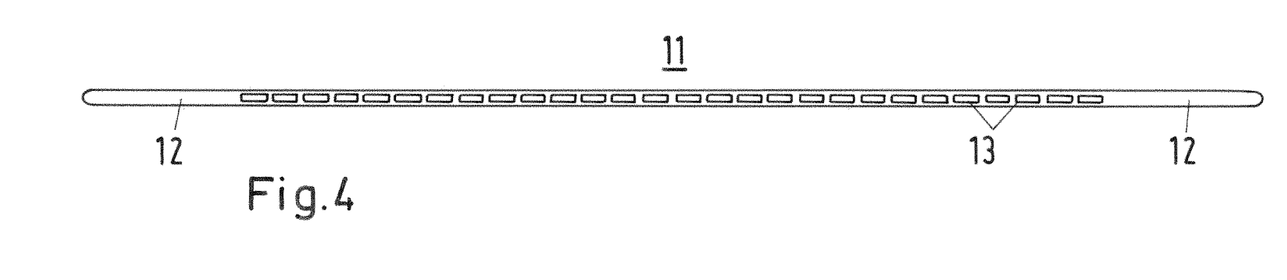
FIG. 4 shows a cross-sectional view of the first fluid line.

Finally, FIG. 4 shows a cross-sectional view of the first fluid line 11. Here, it can be seen that, within the fluid line 11, provision is made of a multiplicity of longitudinally extending separating walls which, within the fluid line 11, separate a corresponding multiplicity of line channels 13 from one another. The line channels 13 do not extend here over the entire width of the fluid line 11, but rather there is an edge region 12 on the left and on the right of the line channels 13 in which no line channels 13 are provided. Said edge region 12 can altogether extend to up to half the width of the fluid line 11. The width of the fluid line 11 is to be understood as meaning the horizontal extent thereof in FIG.

4, and the axial direction is to be understood as meaning the direction which is perpendicular to the plane of the drawing.

Figure 5A:
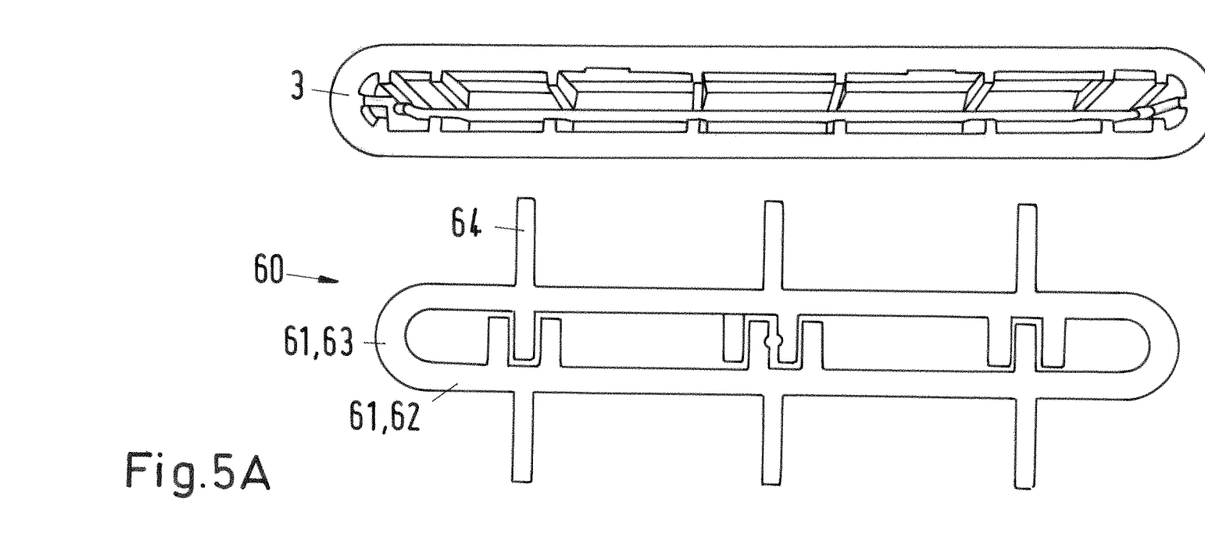
FIG. 5A shows a plan view of a fixing element in a semi-finished state.
Figure 5B:
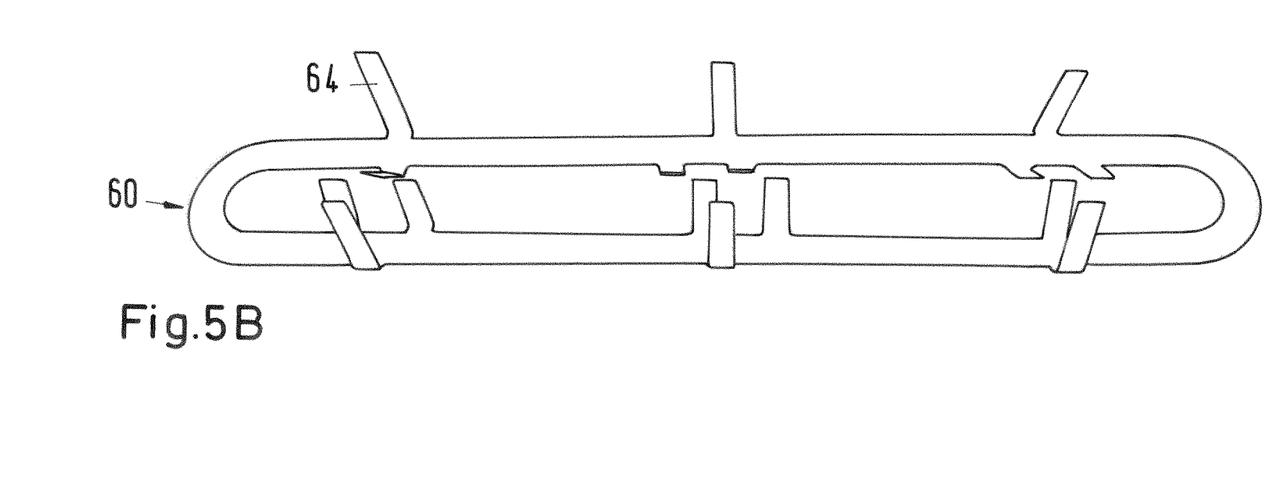
FIG. 5B shows a perspective view of a fixing element in the finished state.

FIG. 5A shows a fixing element 60 in a semi-finished state and above this, for the purpose of comparison, a locking element 3. The fixing element 60 may be a metal clamping piece manufactured from a blank or from a metal sheet. The fixing element 60 may, for example, be cut out of a metal sheet by means of a laser cutter. The fixing element may comprise a peripheral section 61 which consists of two parallel and/or straight longitudinal sections 62 and of two curved sections 63 which connect the two longitudinal sections 62. The stated sections form a coherent peripheral section 61 through which the first fluid line 11, in the finished state of the peripheral section 60, can be led. The finished state of the peripheral section 60 is shown in FIG. 5B. The length of a longitudinal section 62 corresponds approximately to the width of the first fluid line 11.

Bending sections 64 are provided along the longitudinal sections 62 of the peripheral section 61. A total of six bending sections 64 arranged on the outer edge of the peripheral section 61 may be provided, of which bending sections in each case two are arranged opposite one another. Bending sections 64 may likewise be provided on the inner edge of the peripheral section 61. The inner bending sections 64 may be arranged in each case offset from one another. The inner bending sections 64 may be formed to be shorter than the outer bending sections 64. In the semi-finished state shown in FIG. 5A of the fixing element 60, both the peripheral section and the bending sections 64 may be arranged in a plane. The bending sections 64 of the fixing element 60 may be arranged along the longitudinal sections 62 in such a way that, in the assembled state of the connector 1, at least a portion of the bending sections 64 is present between ribs of the locking element 3.

FIG. 5B shows the fixing element 60 in a finished state, in which all the bending sections 64 have been bent in a direction through approximately 80°-90°. In this state, the fixing element 60 can be coupled to the further components of the connector 1, wherein the first fluid line 11 can be led through the leadthrough of the peripheral section 61 that is bordered by the peripheral section 61.

Figure 6:
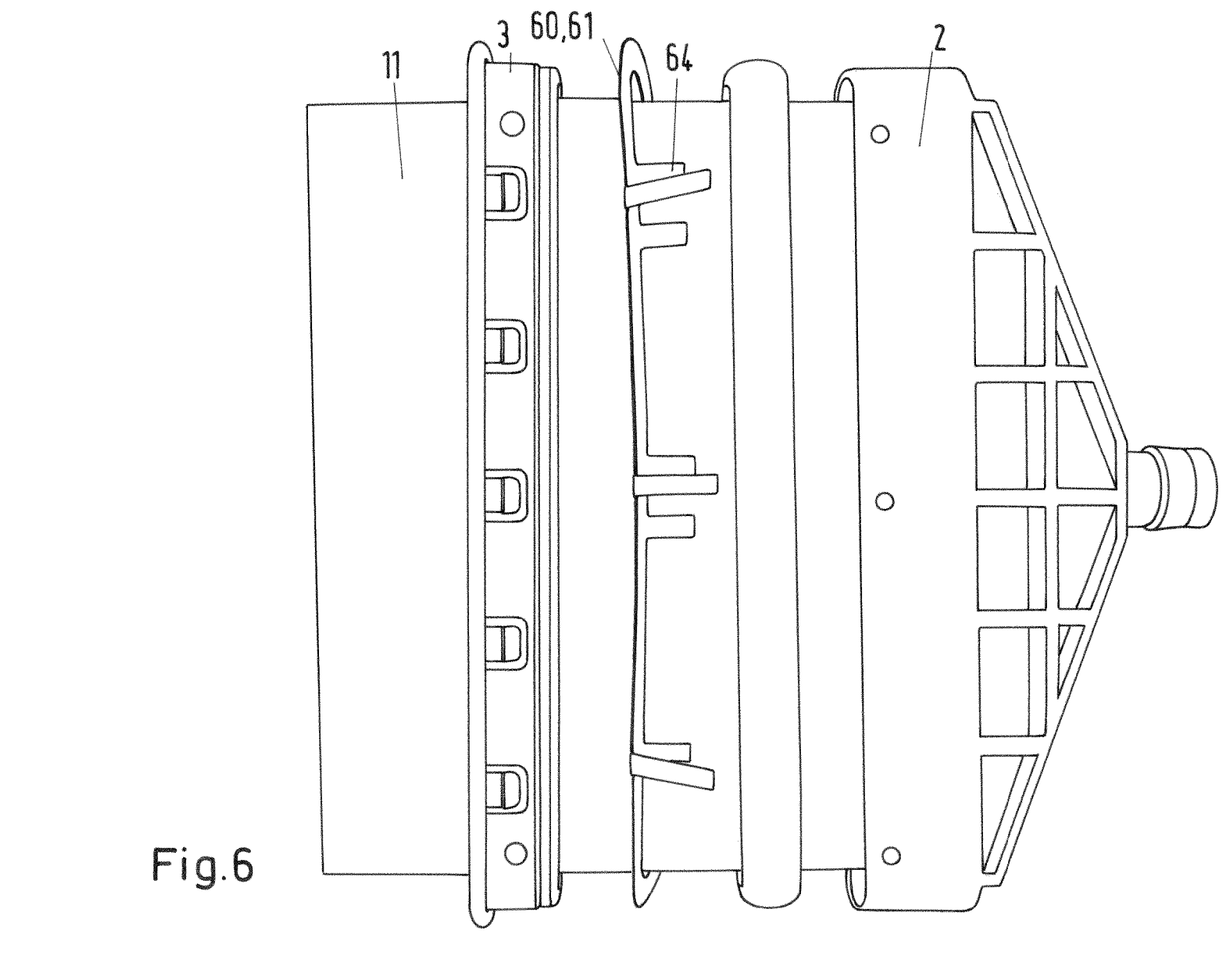
FIG. 6 shows an exploded view of a connector arrangement with fixing element.

FIG. 6 shows an exploded view of a connector arrangement with a fixing element 60, which is arranged between the housing 2 and the locking element 3. The first fluid line 11, for the purpose of fitting the connector arrangement, is pushed into fixing element 60, which fixing element is situated within the further structure of the connector. In the fully assembled state of the connector arrangement, at least a portion of the bending sections 64 of the fixing element 60 may be located within the housing 2. In the fully assembled state, the peripheral section 61 of the fixing element 60 is situated between bearing surfaces of the housing 2 and the locking element 3 and is in this way fixed.

Figure 7:
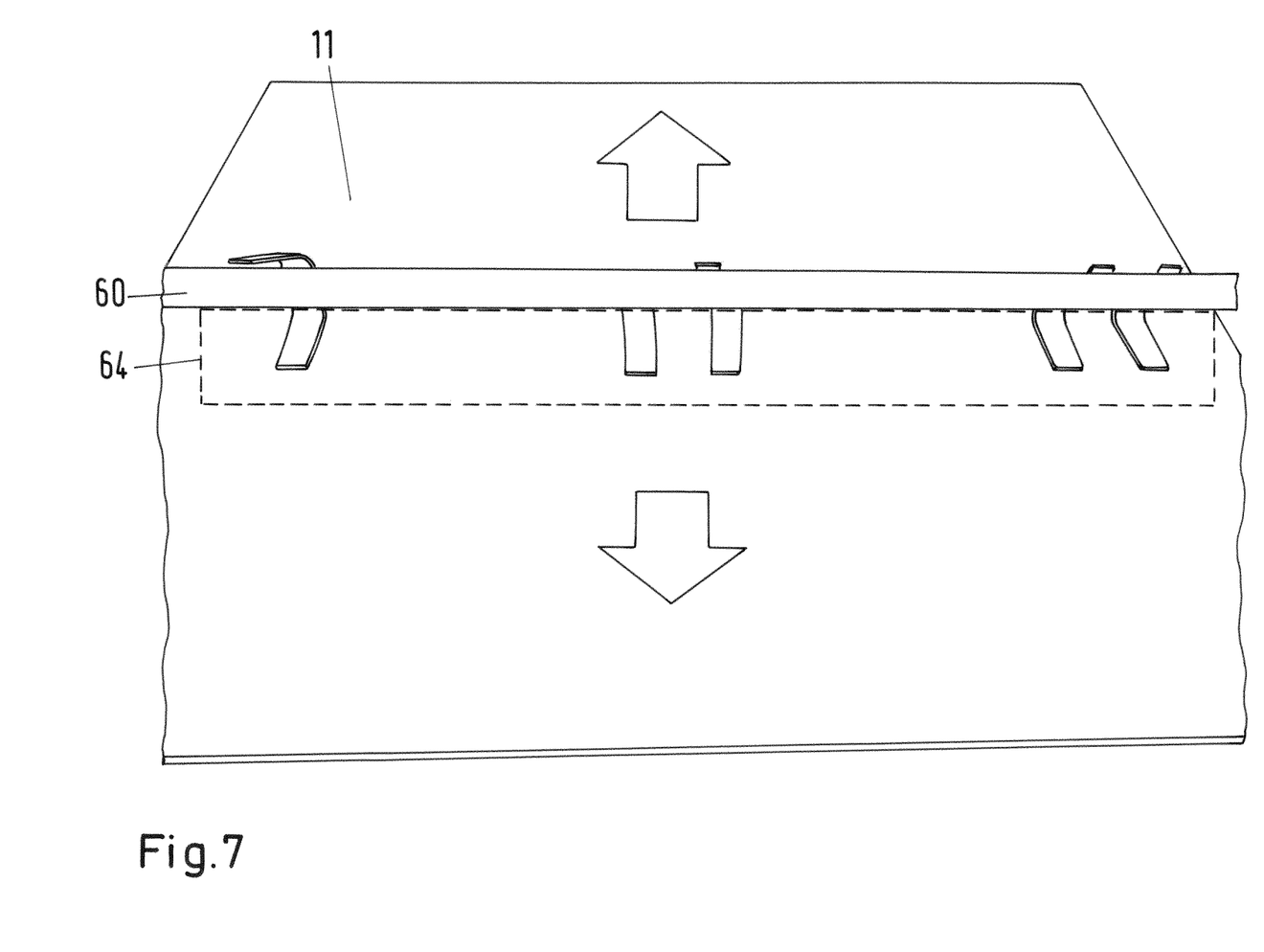
FIG. 7 shows the functioning principle of the fixing element.

FIG. 7 shows the functioning principle of the fixing element 60. For the purpose of clarity, the housing 2 and the locking element 3 are not shown. The unilateral shaping of the geometry or of the bending sections 64 of the fixing element 60 gives rise to a geometry which resembles barbs. These barbs prevent unwanted pulling-out of the aluminum profile or of the first fluid line 11 in the direction opposite to the direction of fitting (upper arrow). By contrast, the fitting of the fluid line 11 is, by way of simple plugging into the connector 1, still possible (lower arrow).

The invention is not restricted to one of the embodiments described above, but rather may be modified in a variety of ways.

All the features and advantages that emerge from the claims, from the description and from the drawing, including structural details, spatial arrangements and method steps, may be essential to the invention both individually and in a wide variety of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Connector
2 Housing
3 Locking element
4 Seal
5 Receiving section
6 Fixing section
11 First fluid line
12 Edge region
13 Line channel
14 Leadthrough
21 First connection section
22 Second connection section
23 Fluid channel
24 Stiffening rib
31 Cutout
32 Snap-fit connection
33, 33' Rib
34 Edge section
60 Fixing element
61 Peripheral section
62 Longitudinal section
63 Curved section
64 Bending section

The invention claimed is:
1. A connector for two fluid lines of different geometries, having
 a housing, which comprises a first and a second connection section and a fluid channel which fluidically connects both connection sections, a locking element, which can be coupled to the housing, the locking element having a first fixing section having at least one hole, and a seal, which can be arranged between the housing and the locking element, wherein the locking element and the housing can be arranged with respect to one another in relation to the fluid channel in such a way that a receiving section for receiving the seal is formed between the housing and the locking element, wherein the first connection section is configured for connection of a first fluid line having an elongate cross section and at least one through-hole, the second connection section is configured for connection of a second fluid line with another cross section, wherein the at least one hole and the at least one through-hole align to receive a fixing element for fixing the first fluid line to the connector in a form-fitted manner.

2. The connector as claimed in claim 1, wherein the housing is manufactured as a single piece by injection molding or die casting or additive production.

3. The connector as claimed in claim 1, wherein the housing and the locking element are latch-able to one another.

4. The connector as claimed in claim 1 wherein a second fixing section is provided at the housing and/or at the locking element and is configured for fixing of the first fluid line.

5. The connector as claimed in claim 4, wherein the second fixing section includes at least one cutout for introduction of at least one snap-fit connection, wherein the at least one snap-fit connection is configured for fixing the first fluid line to the connector in a form-fitted manner.

6. The connector as claimed in claim 1 wherein the connector consists of the exactly three components housing, locking element and seal.

7. The connector as claimed in claim 1, wherein outer dimensions of the housing and the locking element, in terms of their cross sections, are complementary to each other.

8. The connector as claimed in claim 1, wherein the fluid channel is formed planar within the housing.

9. The connector as claimed in claim 8, wherein the first fluid line is introducible at least partially into the fluid channel.

10. The connector as claimed in claim 8, wherein the housing comprises stiffening ribs at an outside.

11. A connector arrangement having a connector as claimed in claim 1, wherein the connector is coupled to the first fluid line which is in the form of a flat channel.

12. The connector as claimed in claim 1, wherein the locking element is manufactured as a single piece by injection molding or die casting or additive production.

13. The connector as claimed in claim 1, wherein the housing and locking element are manufactured as a single piece by injection molding or die casting or additive production.

14. The connector as claimed in claim 1, wherein the connector consists of the three components housing, locking element, and seal and at least one fixing element.

* * * * *